No. 853,575. PATENTED MAY 14, 1907.
J. W. BOILEAU.
METHOD OF TREATING ORES.
APPLICATION FILED NOV. 7, 1902.
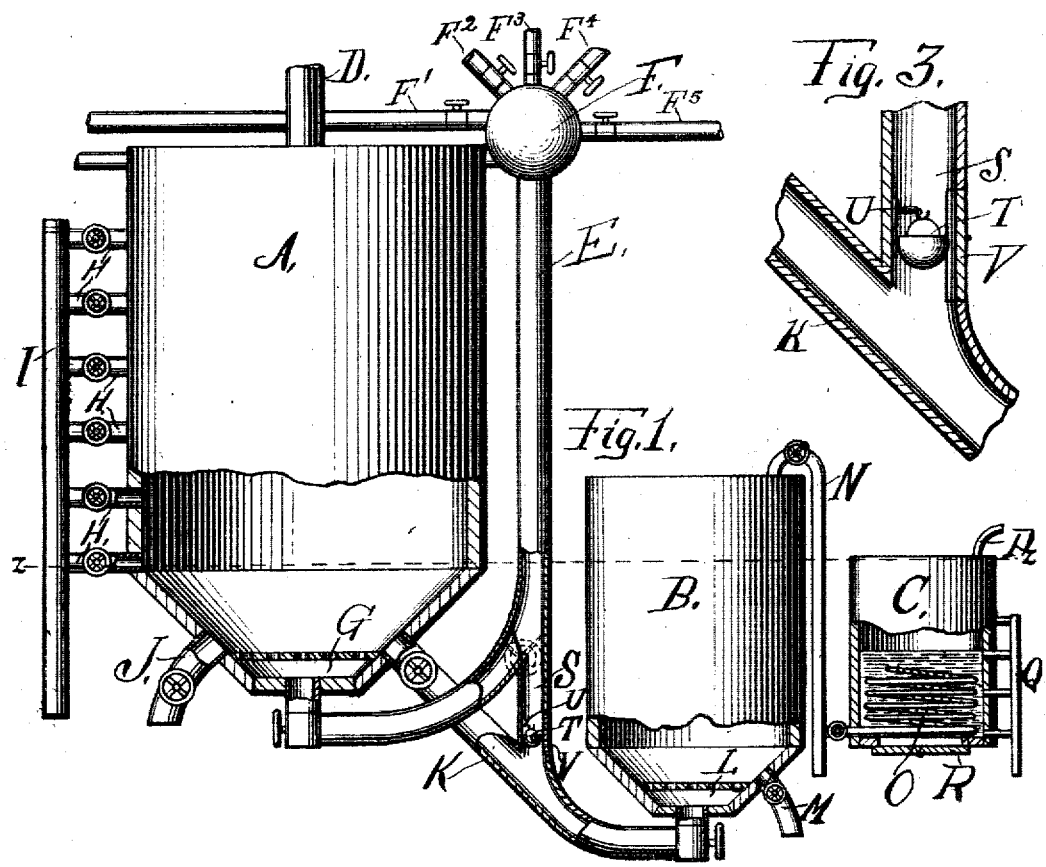
Fig. 1.
Fig. 3.
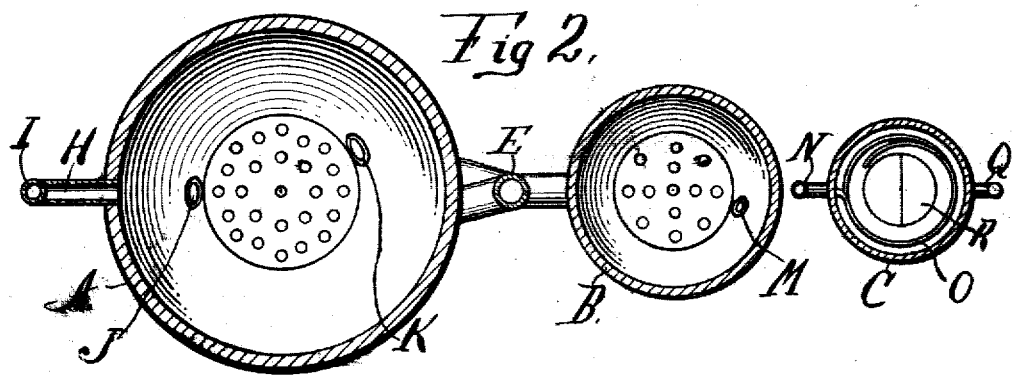
Fig. 2.
Witnesses
C. Easterling
A. E. Greist
James W. Boileau, Inventor
by T. D. Smith
Attorney

UNITED STATES PATENT OFFICE.

JAMES W. BOILEAU, OF DENVER, COLORADO, ASSIGNOR OF ONE-HALF TO JAMES B. KNOBLOCK, OF DENVER, COLORADO.

METHOD OF TREATING ORES.

No. 853,575.      Specification of Letters Patent.      Patented May 14, 1907.

Original application filed February 25, 1902, Serial No. 95,626. Divided and this application filed November 7, 1902. Serial No. 130,394.

*To all whom it may concern:*

Be it known that I, JAMES W. BOILEAU, a citizen of the United States, residing at Denver, in the county of Arapahoe and State of Colorado, have invented certain new and useful Improvements in Methods of Treating Ores; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention pertains to an improvement in the treatment of metalliferous ores, whereby, in a ready, inexpensive, practical and effective manner, the values are separated from the deterrent elements associated therewith, and extracted and saved in metallic form.

While my method is particularly adapted, as hereinafter set forth, to the treatment of copper ores, certain steps thereof are also advantageously employed in the treatment of gold and silver ores.

My invention consists in a method of eliminating the deterrent elements, putting the copper in solution, separating the solution from foreign matter and precipitating the copper in metallic form, as hereinafter particularly described and claimed.

In the accompanying drawings, I have illustrated a form of apparatus by means of which my process may be advantageously carried out, but I do not wish to be limited to a process performed in any particular apparatus, as it may be used in slight modifications of apparatus now commonly employed with other methods.

In these drawings, in which like letters of reference indicate corresponding parts throughout, Figure 1 is a view in elevation, partly in section, of apparatus adapted to my process; Fig. 2 is plan sectional view on the line z—z of Fig. 1; Fig. 3 is a fragmentary detail of a portion of the apparatus.

Referring to the drawings more in detail, A represents the main tank wherein the ore is first separated from its deterrent elements and put into solution.

B is the tank in which the copper is precipitated from its solution.

C is an auxiliary tank for catching and saving any solids carried over in the vapors from tank B.

D is a pipe for supplying crushed ore to the tank A.

E is a pipe having connection by valved branch pipes, $F'$, $F^2$, $F^3$, $F^4$ and $F^5$, all meeting in the enlargement or bulb F, with sources of supply of gas water, acids, brine and compressed air, which may be supplied singly or in combination as desired. The pipe E terminates below a foraminous distributing plate in the converging bottom of the tank A, as shown at G. Tapping the tank A are the vertically arranged valved pipes H meeting in the common pipe I, by means of which floated impurities, such as vegetable carbon and other light matter, are withdrawn from the top downward. In the lower portion of this tank are the discharge pipes J and K, the former for withdrawing solids not put in solution, and the latter connecting with the lower part of tank B below which it terminates in a distributing plate L similar to the plate G in tank A. It will be understood that, if desired, a perforated coil of pipe may be substituted for the foraminous plates.

In the bottom of the tank B is the valved discharge M for removing the precipitate, and leading from the upper portion of the tank is the vapor discharge pipe N terminating in a perforated coil O in the bottom of the tank C, which is adapted to be partially filled with water and is provided with the relief pipe P, the draw-off Q and the trap R. S represents a pipe leading from an air compressor and heater and tapping the pipe K intermediate the two tanks A and B, whereby hot air under pressure may be supplied to and distributed throughout the contents of the tank B. Preferably, this pipe S, instead of being an independent pipe, is m... branch from the pipe E, as illustrated, its operation being the same in either case.

In practice, the ore, finely crushed, is fed into the tank A. Water, preferably hot, is then turned into the pipe E by way of the bulb F and thence into the tank A, being thoroughly distributed throughout the ore by the plate G. The water floats any vegetable matter and other light impurities to the top. This water is then ...
the pipes H, opening the same from the top downward, thus carrying away the floating impurities, including to a considerable extent lime, antimony, sulfur and arsenic. After this preliminary treatment, by a proper manipulation of the valves, water at the boiling point together with approximately five per cent. of sulfuric acid and one to two per cent. of salt are forced through the ore in the same manner from the bulb F the pipe E, and the plate G. This mixture is caused to thoroughly saturate the ore. The supply is then shut off, and a blast of hot air at from 250° to 300° is turned on and continued for from one-half to two hours under pressure, when the copper in the ore will be found to be in solution and may be withdrawn through the pipe K into the tanks B and C for precipitation in known manner, while the residue is discharged through pipe J and, if other metals are present, may be subjected to concentration, amalgamation, or such further treatment as may be suitable. It will be understood that the proportions of the acid solution and length of treatment will vary with different ores.

This application is a division of an application filed by me on the 25th day of February, 1902, Serial Number 95,626, said division being in compliance with the requirement of the office.

Having thus fully described my invention, what I claim as new and desire to secure by Letters Patent, is:

1. The method of treating ores which consists in putting the copper in solution by subjecting the ore in a pulverized condition to the action of a solution of an acid, salt and water in the presence of air under pressure.

2. The method of treating ores which consists in putting the copper in solution by subjecting the ore in a finely pulverized condition to the action of sulfuric acid, salt and water and to hot air under pressure.

In testimony whereof, I affix my signature in presence of two witnesses.

JAMES W. BOILEAU.

Witnesses:
ANNETTA PAULSTIEN,
MABEL JONES.